United States Patent [19]

Adesko

[11] 4,397,989

[45] Aug. 9, 1983

[54] HIGH SOLIDS COATING COMPOSITION OF AN ACRYLIC POLYMER A POLYESTER POLYOL AND AN ALKYLATED MELAMINE CROSSLINKING AGENT

[75] Inventor: Paul L. Adesko, Troy, Mich.

[73] Assignee: E. I. Du Pont de Nemours & Co., Wilmington, Del.

[21] Appl. No.: 346,737

[22] Filed: Feb. 8, 1982

[51] Int. Cl.³ ............................................. C08L 67/02
[52] U.S. Cl. .................................... 525/162; 427/409;
428/482; 524/512; 525/165; 525/173
[58] Field of Search ....................... 525/162, 157, 173;
428/482

[56] References Cited

U.S. PATENT DOCUMENTS

| | | | |
|---|---|---|---|
| 3,622,651 | 11/1971 | Vasta | 260/856 |
| 3,637,546 | 1/1972 | Parker | 260/15 |
| 3,674,734 | 7/1972 | Parker | 260/31.2 N |
| 3,841,895 | 10/1974 | Hick | 117/72 |
| 3,994,851 | 11/1976 | Chang | 525/162 |
| 4,221,683 | 9/1980 | Nakate et al. | 525/162 |
| 4,276,212 | 6/1981 | Khanna et al. | 525/162 |
| 4,281,078 | 7/1981 | Strolle et al. | 525/131 |
| 4,330,458 | 5/1982 | Spinelli et al. | 525/162 |

*Primary Examiner*—Theodore E. Pertilla
*Attorney, Agent, or Firm*—Hilmar L. Fricke

[57] ABSTRACT

The high solids coating composition contains at least 40% by weight of a binder of film-forming constituents in which the constituents are of (1) an acrylic polymer of styrene or methyl methacrylate or mixtures thereof, an alkyl acrylate or an alkyl methacrylate and a hydroxyl alkyl acrylate or methacrylate (2) a polyester polyol and (3) an alkylated melamine formaldehyde crosslinking agent and optionally, an acid catalyst;

the composition is particularly useful as a primer or an exterior finish for automobiles, trucks, airplanes and can be used as an appliance finish and for coil coatings.

13 Claims, No Drawings

HIGH SOLIDS COATING COMPOSITION OF AN ACRYLIC POLYMER A POLYESTER POLYOL AND AN ALKYLATED MELAMINE CROSSLINKING AGENT

BACKGROUND OF THE INVENTION

This invention is related to high solids coating compositions, in particular, to high solids acrylic coating compositions.

Conventional coating compositions of a high molecular weight acrylic polymer and a melamine crosslinking agent are well known in the art as shown by Vasta U.S. Pat. No. 3,622,651, issued Nov. 23, 1971; Hick U.S. Pat. No. 3,841,895, issued Oct. 15, 1974; Parker U.S. Pat. No. 3,674,734, issued July 4, 1972 and Parker U.S. Pat. No. 3,637,546, issued Jan. 25, 1972. These patents illustrate good quality coating compositions. However, these compositions have a relatively high solvent content to provide for good application properties and for good properties of the resulting finish. To utilize these compositions in areas which have strict air pollution regulations, pollution abatement equipment is required. This equipment is expensive and increases capital investment of a plant and is costly to operate. Any attempt to reduce the solvent content of these conventional compositions generally results in finishes which have either a poor appearance or unacceptable physical properties or both.

There is a great need for a coating composition that has a low solvent content and that will meet current air pollution regulations but still provides a high quality finish that is useful as an exterior finish for automobiles, trucks and airplanes. The high solids coating composition of this invention has these desirable characteristics.

SUMMARY OF THE INVENTION

The high solids coating composition comprises at least 40% by weight of a binder of film-forming constituents and up to 60% by weight of a non-aqueous liquid carrier; in which the film-forming constituents consist essentially of about (1) 10-50% by weight, based on the weight of the binder, of an acrylic polymer consisting essentially of
   (a) 10-50% by weight, based on the weight of the polymer, of styrene, methylmethacrylate or mixtures thereof,
   (b) 30-70% by weight, based on the weight of the polymer, of an alkyl methacrylate, or an alkyl acrylate each having 2-12 carbon atoms in the alkyl group, and
   (c) 15-50% by weight, based on the weight of the polymer, of a hydroxy alkyl acrylate or methacrylate having 2-4 carbon atoms in the alkyl group, and
the polymer having a number average molecular weight of 500-20,000;

(2) 10-60% by weight, based on the weight of the binder, of a polyester polyol having a number average molecular weight of 1500 or less and an acid number of 20 or less which is the reaction product of
   (a) neopentyl glycol and at least one other hindered diol containing two methylol groups wherein each methylol group is attached directly to a cycloaliphatic or aromatic structure or to a tertiary carbon atom, the molar ratio of neopentyl glycol to hindered diol being 2:1 to 6:1, and
   (b) a mixture of aromatic and aliphatic dicarboxylic acids wherein the molar ratio of aromatic acid to aliphatic acid is from 1.5:1 to 10:1,
wherein the molar ratio of (a) to (b) is from 1.3:1 to 1.9:1 and wherein the polyol has a hydroxyl content of about 3.0-10.0% by weight;

(3) 15-40% by weight, based on the weight of the binder, of a fully or partially alkylated melamine formaldehyde crosslinking agent having 1-4 carbon atoms in the alkyl group;

and in addition to the binder the composition may contain up to about 2.0% by weight of an acid catalyst.

DESCRIPTION OF THE INVENTION

The high solids coating composition has a binder content of film-forming constituents of at least 40% by weight. Generally, the composition has a binder content of about 55-85%. The remainder of the composition is a liquid carrier which generally is solvent for the binder. In addition, the composition optionally contains about 0.1-50% by weight, based on the weight of the coating composition, of pigment.

The binder or film-forming constituents used in the coating composition comprise about 10-50% by weight of an acrylic polymer, about 10-60% by weight of a polyester polyol and about 15-40% by weight of a fully or partially alkylated melamine formaldehyde crosslinking agent. Preferably, the binder comprises about 15-45% by weight of acrylic polymer, 25-45% by weight of a polyester polyol and 20-35% by weight of a fully alkylated melamine formaldehyde crosslinking agent.

The acrylic polymers utilized in the coating composition are prepared by solution polymerization in which the monomers are blended with solvent, polymerization catalyst and optionally, a chain transfer agent, and heated to about 75°-160° C. for 1-10 hours to form a polymer that has a number average molecular weight of about 500-20,000, a hydroxyl content of 2 to 7% by weight and a measured glass transition temperature of about 0° to 30° C.

The number average molecular weight of the acrylic polymers is determined by gel permeation chromatography using polymethylmethacrylate as a catalyst solution and optionally, a chain transfer agent into a polymerization vessel at a given rate. These programmed additions can be manually calculated or calculated by a computer. This allows for the polymerization of the low and medium molecular weight acrylic polymers. Optionally, the polymers can be terminated with the chain transfer agent at the desired low molecular weight. Also, if required, after the polymerization is completed, solvents can be stripped off to increase the polymer solids content of the resulting polymer solution.

Typical solvents which are used to prepare the acrylic polymers are the following: toluene, ethyl acetate, acetone, methylisobutyl ketone, methyl n-amyl ketone, methylisoamyl ketone, ethylamyl ketone, amyl acetone, methylethyl ketone, ethyl alcohol, mineral spirits, ethylene glycol monoethyl ether acetate, and other aliphatic, cycloaliphatic and aromatic hydrocarbon, esters, ethers, ketones and alcohols which are conventionally used.

About 0.1-6% by weight, based on the weight of the monomers, of the polymerization initiator is used to prepare the acrylic polymer. Typical initiators are: azobis-isobutyronitrile, t-butyl perbenzoate, t-butyl per 2-methyl benzoate, (o-toluate), t-butyl per caprate, t- butyl azo 2-cyanobutane t-butyl azo 1-cyanocyclo hexane, azo-bis(gamma dimethyl valeronitrile), benzoyl peroxide, t-butyl pivalate and other peroxygen or azo type initiators selected for the reaction conditions used to prepare the polymer.

Optionally, chain transfer agents can be used to control the molecular weight of the acrylic polymers. Typical chain transfer agents are 2-mercapto ethanol, dodecyl mercaptan, benzene thioethanol, mercapto succinic acid, butyl mercaptan, lauryl mercaptan, mercapto propionic acid and the like. When a transfer agent is used, the resulting acrylic polymer contains about 0.5–10% by weight of a chain transfer agent.

The acrylic polymers used in the high solids coating composition are of styrene, methyl methacrylate or a mixture of styrene and methyl methacrylate an alkyl acrylate or an alkyl methacrylate that have 2–12 carbon atoms in the alkyl group and a hydroxy alkyl acrylate or a hydroxy alkyl methacrylate each having 2–4 carbon atoms in the alkyl group. To form an acrylic polymer which has a hydroxyl content of about 2–7% by weight, a sufficient amount of the aforementioned hydroxy alkyl acrylate or methacrylate is utilized. The polymer also can contain small amounts of α,β-ethylenically unsaturated carboxylic acid, such as acrylic acid, methacrylic acid, itaconic acid, in amounts of about 0.1–5% by weight.

Typical alkyl methacrylates and acrylates that can be used to prepare the acrylic polymers are: ethyl methacrylate, butyl methacrylate, hexyl methacrylate, 2-ethylhexyl methacrylate, lauryl methacrylate, ethyl acrylate, propyl acrylate, isopropyl acrylate, butyl acrylate, isobutyl acrylate, hexyl acrylate, 2-ethylhexyl acrylate, lauryl acrylate and the like.

Adhesion promoting monomers can also be used in the acrylic polymers such as diethyl aminoethyl methacrylate, tertiary butyl aminoethyl methacrylate, 3-(2-methacryloxy ethyl)-2,2-spiro cyclohexyl oxazolidene and the like.

Typical hydroxyl alkyl acrylates and methacrylates which can be used to prepare the acrylic polymers are: 2-hydroxy ethyl acrylate, 2-hydroxy propyl acrylate, 2-hydroxy butyl acrylate, 2-hydroxy ethyl methacrylate, 2-hydroxy propyl methacrylate, 2-hydroxy butyl methacrylate, 3-hydroxy propyl acrylate, 4-hydroxy butyl acrylate and the like.

Useful acrylic polymers comprise about 15–25% by weight styrene, by 45–55% by weight butyl methacrylate, 25–35% by weight hydroxyl ethyl acrylate and have a number average molecular of 1,500–10,000. Preferred acrylic polymers of the above type contains about 20% styrene, 50% butyl methacrylate and 30% hydroxy ethyl acrylate.

The polyester polyol used in the high solids coating composition has a number average molecular weight, usually measured by gel permeation chromatography with polystyrene standards, of 1500 or less, and an acid number of 20 or less. Although it has been found that any polyester polyol or mixtures of various polyols that meet this description are usable in the present invention, two relatively specific polyols, which can be used in the present invention either separately or as mixtures with each other, are preferred.

The first preferred polyester polyol is the condensation-reaction product of neopentyl glycol, at least one other hindered diol, and an aromatic and an aliphatic dicarboxylic acid.

The alcoholic components used to form this relatively specific polyester polyol are neopentyl glycol and at least one other hindered, diprimary diol. It has been found that this combination of difunctional alcohols ultimately imparts weatherability, flexibility, chemical and solvent resistance and hardness to a finish of the coating composition. The hindered diprimary diols that are usable in this invention are those having two methylol groups, each of which is attached directly to an aromatic or cycloaliphatic hydrocarbon structure or to a tertiary carbon atom. Examples of two preferred such diols are cyclohexane dimethylol and the monoester of neopentyl glycol and hydroxypivalic acid. This ester can be formed according to U.S. Pat. No. 3,057,911. A particularly useful polyol is formed when the molar ratio of neopentyl glycol to other hindered diprimary diol is from 2:1 to 6:1.

The dicarboxylic acids useful in the formation of the polyester polyol have the general formula:

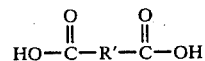

where R' is aliphatic or aromatic. Of the aliphatic structures, the most useful are where R' is alkylene, vinylene, or cycloaliphatic.

Preferred acids when R' is alkylene are those in which R' is 2–10 carbon atoms. Most preferred of these are succinic acid, glutaric acid, azelaic acid, adipic acid, and pimelic acid. When R' is a monounsaturated aliphatic, the most useful acids are those in which R' has 2–8 carbon atoms with the preferred acids being maleic and itaconic acids. The aromatic, dicarboxylic acids that are preferred are phthalic, iso-phthalic, terephthalic, uvitic, and cumidinic acids. When R' is cycloaliphatic, preferred are cyclohexane or cyclohexene dicarboxylic acids, although other such dicarboxylic acids could also be used.

Mixtures of these aromatic acids and aliphatic acids can be used, but at least one of each kind of acid must be present. Whether mixtures of each kind of acid are used, or whether only one of each kind of acid is used, the molar ratio of aromatic diacids to aliphatic diacids should have a range of about 1.5:1 to 10:1. A ratio of 2:1 to 6:1 is preferred and a ratio of about 4:1 is most preferred. It is to be further understood that the lower alkyl mono or di-esters of these acids and the anhydrides, where applicable, of these acids can also be used in place of the acids themselves with equivalent results. If the above-mentioned esters are used, the alkyl groups preferably have no more than 5 carbon atoms.

A polyester polyol that is particularly useful in the present invention is formed when the molar ratio of the alcoholic components to the dicarboxylic acid components is from 1.3:1 to 1.9:1, with about 1.6:1 being preferred. One preferred polyester polyol is the reaction product of the monoester of neopentyl glycol hydroxy pivalate, neopentyl glycol, phthalic anhydride, iso-phthalic acid and adipic acid.

These polyester polyols can typically be formed by charging the reactants, a suitable solvent, and optionally a reaction catalyst into a reaction vessel that is usually equipped with a condenser and agitator. Useful solvents are, for example, xylene, toluene, other substituted benzenes, naphthalene and substituted naphthalenes. The reaction catalysts can be present in the usual amounts and include, for example dibutyl tin oxide, dibutyl tin dilaurate, surfuric acid, or one of the sulfonic acids.

The reaction mixture is heated to its reflux temperature, usually 100°–300° C., and there maintained for a period of 1–8 hours. During this period, the esterification by-products are withdrawn. The reaction product, the polyester polyol, should have a number average molecular weight (determined by gel permeation chromatography based on polystyrene standards) of 300–1500, preferably 400–1000. The reactants should be chosen so that the polyol has a hydroxyl content of 3–10% by weight, preferably about 5.5–7.5% by weight. Also, as described earlier, the polyol should have an acid number of 20 or less and preferably 12 or less.

The second preferred polyester polyol is hydroxy-terminated and is the condensation product of 2,2,4-trimethyl-1,3-pentane diol (TMPD) and an aliphatic dicarboxylic acid, its esters, or mixtures of the acid and esters. The acid is of the general formula HOOC—$(HC_2)_m$—COOH where m is 1–6, preferably 2–4. In one preferred polyol, a mixture of dicarboxylic acids is used, the mixture containing succinic, glutaric, and adipic acids. The choice of a specific ratio of these acids can depend on the final coating property desired, such as flexibility. In this preferred polyol, the ratio is about 1:2:1 by weight of succinic, glutaric, adipic acids.

The final TMPD/aliphatic dicarboxylic acid polyol mixture is represented by the following general formula, although the isomeric products, through the secondary hydroxyl groups, can also be present:

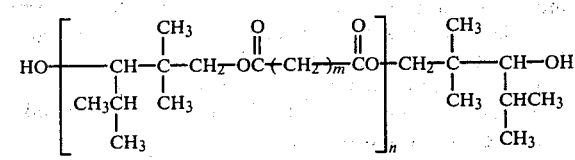

where n=0–4 and m=1–6.

Within the constraints of the parameters m and n, the average number-average molecular weight of the polyol must not exceed 1500. It is recognized by one skilled in the art that a polyester is itself a mixture of different molecular weight species, meaning that the value of n in the above structure can vary. Therefore, it is contemplated that minor amounts of higher molecular weight species, value of n up to 10, may be present in the polyol mixture so long as the overall average number-average molecular weight is less than 1500. It is preferred, however, that values of n be 0, 1, 2, or 3 with no more than 25% by weight of n being 0.

For best overall properties of the coating composition, a low final acid number is desired for the polyester polyols used in the film-forming blend. The acid number is usually 20 or less, but it is preferred that the acid number not exceed 12. The acid number is defined as the number of milligrams of potassium hydroxide required to neutralize a 1-gram sample of the polyester polyol.

The polyester polyol described above may be formed by any of the conventionally known methods for condensation reactions. The reaction takes place at reflux, usually 115°–250° C., in the presence, if desired, of one or more organic solvents such as listed earlier. The reaction may be carried out in the present of an esterification catalyst of usual concentration.

Fully or partially alkylated melamine formaldehyde crosslinking agents or resins used in the composition generally have 1–4 carbon atoms in the alkyl group. The resin is prepared by conventional techniques in which alcohol such as methanol, ethanol, propanol, isopropanol, butanol, isobutanol, tertiary butanol and the like is reacted with a melamine formaldehyde resin. The resin can be monomeric or polymeric. Preferred resins which give a high quality finish are hexamethoxymethyl melamine and hexamethoxy/butoxymethyl melamine. Typical resins of the preferred type are "Cymel" 303 and 1130 and "Resimine" 747 and 755. Generally, the higher solids and lower viscosity alkylated melamine formaldehyde resins are preferred to provide maximum application solids for the coating composition. These resins include "Cymel" 325, 327 or 1158 and "Resimine" 717 among others.

As mentioned before, the composition can contain pigments. These pigments can be introduced into the composition by first forming a mill base with the polyester polyol, the acrylic polymer or the melamine resin utilized in the composition or with other compatible polymers or polymeric dispersants by conventional techniques, such as sand-grinding, ball milling, attritor grinding, two roll milling to disperse the pigments. The mill base is blended with the film-forming constituecoating compositions can be utilized in this composition such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic dyes.

In coating compositions that use aluminum flake, the aluminum flake is blended with the polyester polyol or the acrylic polymer and the resulting mill base is blended into the coating composition.

An acid catalyst solution can be added to the composition to increase the rate of cross-linking of the composition on curing. Generally, about 0.1–2% by weight, based on the weight of the composition, of acid catalyst is used. Sulfonic acid or a substituted sulfonic acid can be used such as para-toluene sulfonic acid dodecylbenzene sulfonic acid or dinonyl naphthalene disulfonic acid and mixtures thereof.

Adducts of the aforementioned acids also can be used as catalysts. For example, epoxy resins or amines reacted with a substituted sulfonic acid may be used. Typical epoxy resins that can be used to form these adducts are "Epon" 828, 1001, 1002, 1003, 1004 which are the condensation products of epichlorohydrin and bisphenol A. Amines that are useful for forming adducts of these acids include primary, secondary and tertiary amines such as n-propyl amine, diisopropanol amine, dimethyl oxazolidine, dimethyl ethanol amine and others. Selection of the amines to be used is dependent upon baking conditions and package stability requirements.

Other catalysts that can be used include phosphoric acid, alkyl acid phosphates such as methyl and butyl acid phosphate and organic acid sulfate esters.

To improve weatherability of finishes of the coating composition, about 0.1–5%, by weight, based on the weight of the binder, of an ultraviolet light stabilizer or a combination of ultraviolet light stabilizers can be added. These stabilizers include ultraviolet light absorbers, quenchers and specific hindered amine light stabilizers. Also, about 0.1–5% by weight, based on the weight of the binder, of an antioxidant can be added. Weatherability of finishes of coating compositions containing aluminum flake are particularly enhanced by the addition of ultraviolet light stabilizers and antioxidants. Also, about 0.1–10% by weight, based on the binder, of iron pyrophosphate can be added with ultraviolet light stabilizers and antioxidants to improve weatherability and moisture resistance of finishes. Typically useful ultraviolet light stabilizers and antioxidants are disclosed hereinafter.

The coating composition of this invention can be applied over a variety of substrate, such as metal, wood, glass, plastics, and the like, by any of the conventional application methods, such as spraying, electrostatic spraying, dipping, brushing, flow-coating and the like. The viscosity of the composition can be adjusted for any of these methods by adding solvents if necessary. Generally, the composition is utilized at a high solids content which keeps air pollution at a minimum level.

The coatings are baked at relatively low temperatures of about 80°–180° C. for about 15 minutes to 2 hours. The resulting coating is about 0.1–5 mils thick but for most uses, a 1–3 mil thick coating is used. One technique that is used to insure that there will be no popping or cratering of the coating is to allow the solvents to flash off for about 15–120 seconds before a second coating is sprayed on or otherwise applied, then waiting from about 2–10 minutes before baking the coating to allow a portion of residual solvents to flash off. The resulting coating has good gloss and can be rubbed or polished with conventional techniques to improve the smoothness, appearance and gloss. The coating has good adhesion to substrates of all types, is hard and resistant to weathering, solvents, alkali, acids and the like. These characteristics make the composition particularly useful as a primer or topcoat for automobiles, trucks, airplanes, railroad equipment and for the repair of trucks and automobiles. The composition can also be used on appliances, vending machines, outdoor equipment such as bridges, water tanks, gas tanks and the like.

Another aspect of this invention is to utilize the composition as a clear coat/color coat finish for substrates. In this finish, a clear coat top layer is in firm adherence to a color coat layer that is in adherence with a substrate. The clear coat is a transparent film of a suitable coating composition which may or may not be the composition of this invention. The color coat is the coating composition of this invention containing pigments in a pigment to binder ratio of about 1/100 to 150/100 and other additives.

Optionally, the color coat can contain about 0.1–5% by weight, based on the weight of the binder of the color coat, of one or more ultraviolet light stabilizers. Another option is that the color coat and the clear coat each can contain about 0.1–5% by weight, based on the weight of the binder of the coat, of an ultraviolet light stabilizer. Also, the clear coat or the color coat can contain about 0.1–5% by weight, based on the weight of the binder of the coat, of an antioxidant.

Preferred, to form a durable finish, both the clear coat and the color coat contain about 1–5% by weight of one or more ultraviolet light stabilizers described below and optionally, about 0.1–1% by weight of the antioxidant.

Iron pyrophosphate can be added to either the clear coat or color coat or both in the aforementioned amounts to enhance weatherability of the clear coat/color coat finish.

The thickness of the fully cured color coat and clear coat can vary. Generally, the color coat is about 0.4–1.5 mils thick and preferably 0.6–1.0 mils thick and the clear coat is about 0.5–6.0 mils thick and preferably 1.0–2.5 mils thick. Any of the aforementioned conventional pigments can be used in the color coat including metallic flake pigments can be used. The clear coat can also contain transparent pigments, i.e., pigments having the same or similar refractive index as the binder of the clear coat and are of a small particle size of about 0.015–50 microns. Typical pigments that can be used in a pigment to binder weight ratio of about 1/100 to 10/100 are inorganic siliceous pigments, such as silica pigments. These pigments have a refractive index of about 1.4–1.6.

Typical ultraviolet light stabilizers that are useful are as follows:

Benzophenones such as hydroxy dodecyloxy benzophenone, 2,4-dihydroxybenzophenone, hydroxybenzophenones containing sulfonic groups and the like.

Triazoles such as 2-phenyl-4-(2',4'-dihydroxylbenzoyl)-triazoles, substituted benzotriazoles such as hydroxy-phenyltriazoles and the like.

Triazines such as 3,5-dialkyl-4-hydroxyphenyl derivatives of triazine, sulfur containing derivatives of diallyl-4-hydroxy phenyl triazines, hydroxy phenyl-1,3,5-triazine and the like.

Benzoates such as dibenzoate of diphenylol propane, tertiary butyl benzoate of diphenylol propane, and the like.

Other ultraviolet light stabilizers that can be used include oxanilides, lower alkyl thiomethylene containing phenols, substituted benzenes such as 1,3-bis-(2'-hydroxybenzoyl) benzene, metal derivatives of 3,5-di-t-butyl-4-hydroxy phenyl propionic acid, asymmetrical oxalic acid diarylamides, alkylhydroxy-phenyl-thioalkanoic acid ester and the like.

Particularly useful ultraviolet light stabilizers that can be used are hindered amines of bipiperidyl derivatives such as those in Murayama et al., U.S. Pat. No. 4,061,616, issued Dec. 6, 1977.

Ultraviolet light quenchers that include nickel compounds can also be used.

Typical antioxidants that are useful are as follows: tetrakis alkylene (di-alkyl hydroxy aryl)alkyl ester alkanes such as tetrakis methylene 3(3',5'-dibutyl-4'hydroxyphenyl)propionate methane, reaction product of p-amino diphenylamine and glycidyl methacrylate, reaction product of n-hexyl-N'-phenyl-p-phenylene diamine and glycidyl methacrylate, pentaerythritol tetrakis(thioglycolate), trimethylol propane tris(thioglycolate), trimethylol ethane tris-(thioglycoate), N-(4-anilino phenyl) acrylamide and the like.

One preferred combination of ultraviolet light stabilizers comprises a substituted 2(2-hydroxyphenyl) benzotriazole and a hindered amine of bipiperidyl derivatives.

The clear coat/color coat finish is applied by conventional spraying techniques and preferably the clear coat is applied to the color coat before the color coat is baked. Other conventional application techniques can be used such as brushing, roller coating, electrostatic spraying and the like. The finish is then dried at ambient temperatures or can be used as indicated above.

The following examples illustrate the invention. All parts and percentages are on a weight basis unless otherwise indicated. The number average molecular weight (Mn) is determined by gel permeation chromatography using polymethyl methacrylate as a standard.

EXAMPLE 1

An acrylic polymer solution is prepared by charging the following constituents into a polymerization vessel equipped with a thermometer, stirrer, reflux condenser, additional funnel, and a heating mantle:

|  | Parts by Weight |
|---|---|
| Portion 1 | |
| Methyl n-amyl ketone | 203.8 |
| Portion 2 | |
| Styrene | 122.3 |
| Butyl methacrylate | 305.7 |
| 2-Hydroxy ethyl acrylate | 183.4 |
| Portion 3 | |
| Methyl n-amyl ketone | 21.4 |
| t-Butyl azo 2-cyanobutane | 21.4 |
| Total | 858.0 |

Portion 1 is heated to its reflux temperature. Portions 2 and 3 are each premixed, and fed concurrently at uniform rates over 8.0 and 8.5 hour periods respectively into the polymerization vessel while maintaining the constituents in the vessel at a reflux temperature (approximately 145°–155° C.). The resulting polymer solution is passed through a 5 micron cartridge type filter. The polymer solution has a polymer weight solids content of about 72% and a Gardner Holdt viscosity measured at 25° C. of about Y-Zl. The polymer is about 20% styrene, 50% butyl methacrylate and 30% 2-hydroxy ethyl acrylate and has a number average molecular weight of about 3500.

A polyester polyol solution is prepared by charging the following constituents into a polymerization vessel equipped as above:

|  | Parts by Weight |
|---|---|
| Portion 1 | |
| Monoester of neopentyl glycol hydroxy pivalic acid | 158.30 |
| Neopentyl glycol | 322.82 |
| Phthalic anhydride | 143.56 |
| Isophthalic acid | 161.02 |
| Adipic acid | 70.81 |
| Dibutyl tin oxide | 0.80 |
| Xylene | 27.89 |
| Portion 2 | |
| Xylene | 15.44 |
| 2-Ethyl hexanol | 42.89 |
| Primary amyl acetate | 31.31 |
| Total | 974.84 |

Portion 1 is charged into a polymerization vessel equipped as above and with a water separator and is heated to its reflux temperature (about 170° C.) and polymerization is continued with the removal of water until an acid number in the range of 5–9 is reached. During polymerization, the temperature increases to about 210° C. Portion 2 is then added and thoroughly mixed with portion 1. The resulting polymer solution has a solids content of about 87% and a Gardner Holdt viscosity measured at 25° C. of about Z2–Z4. The polymer has a number average molecular weight of about 800.

A white mill base is prepared by charging the following constituents into a conventional sand mill and ground for 2 passes:

|  | Parts by Weight |
|---|---|
| Polyester polyol solution (prepared above) | 20 |
| Primary amyl acetate | 4 |
| Aromatic hydrocarbon solvent (Boiling Point 150–190° C.) | 8 |
| Polymeric Dispersant (Low molecular weight mercaptan terminated acrylic polymer reacted with a polyisocyanate and is further reacted with mercapto-succinic acid) | 2 |
| Titanium dioxide pigment | 66 |
| Total | 100 |

A fumed silica dispersion is prepared by charging the following constituents into a conventional sand mill and ground for 2 passes:

|  | Parts by Weight |
|---|---|
| Polyester polyol solution (prepared above) | 45 |
| Primary amyl acetate | 23 |
| Aromatic hydrocarbon solvent (boiling point 150–190° C.) | 23 |
| Fumed silica (hydrophobic) | 9 |
| Total | 100 |

A paint is prepared by thoroughly blending the following ingredients:

|  | Parts by Weight |
|---|---|
| Polyester polyol solution (prepared above) | 131 |
| Acrylic polymer solution (prepared above) | 122 |
| Aromatic Hydrocarbon (Boiling Point 150–190° C.) | 13 |
| Ultraviolet light stabilizer (2-[2'-hydroxy-3',5'-(1-1-dimethyl propyl)phenyl] benzotriazole) | 5 |
| Fumed Silica Dispersion (prepared above) | 140 |
| White Mill Base (prepared above) | 452 |
| Hexamethoxy/butoxy methyl melamine | 110 |
| Partially butylated melamine solution (80% solids in butanol) | 45 |
| n-Butanol | 22 |
| Diisopropanol amine blocked dinonyl naphthalene disulfonic acid catalyst (30% active) | 13 |
| Silicone Solution (10% organo functional dimethyl polysiloxane in xylene) | 2 |
| Silicone solution (10% dimethyl polysiloxane in xylene) | 10 |
| Total | 1065 |

The above composition is sprayed onto a steel panel primed with a baked alkyd resin melamine automotive grade primer and baked for 30 minutes at about 140° C. to give a glossy, hard finish with a good appearance. The finish is resistant to weathering, solvents, acids, bases, scratches and has excellent chip resistance. The above properties show that the coating composition is useful as a primer or topcoat for finishing cars and trucks.

I claim:

1. A high solids coating composition comprising at least 40% by weight of a binder of film-forming constituents and up to 60% by weight of a nonaqueous liquid carrier; in which the film-forming constituents consist essentially of about
   (1) 10-50% by weight, based on the weight of the binder, of an acrylic polymer consisting essentially of
      (a) 10-50% by weight, based on the weight of the polymer, of styrene, methylmethacrylate or mixtures thereof;
      (b) 30-70% by weight, based on the weight of the polymer, of an alkyl methacrylate, or an alkyl acrylate each having 2-12 carbon atoms in the alkyl group, and
      (c) 15-50% by weight, based on the weight of the polymer, of a hydroxyl alkyl acrylate or methacrylate having 2-4 carbon atoms in the alkyl group; and
   the polymer having a number average molecular weight of 500-20,000;
   (2) 10-60% by weight, based on the weight of the binder, of a polyester polyol having a number average molecular weight of 1500 or less and an acid number of 20 or less which is the reaction product of
      (a) neopentyl glycol and at least one other hindered diol containing two methylol groups wherein each methylol group is attached directly to a cycloaliphatic or aromatic structure or to a tertiary carbon atom, the molar ratio of neopentyl glycol to hindered diol being 2:1 to 6:1, and
      (b) a mixture of aromatic and aliphatic dicarboxylic acids wherein the molar ratio of aromatic acid to aliphatic acid is from 1.5:1 to 10:1,
   wherein the molar ratio of (a) to (b) is from 1.3:1 to 1.9:1 and wherein the polyol has a hydroxy content of about 3.0-10.0% by weight;
   (3) 15-40% by weight, based on the weight of the binder, of a fully or partially alkylated melamine formaldehyde crosslinking agent having 1-4 carbon atoms in the alkyl group.

2. The coating composition of claim 1 containing pigment in addition to the binder in the amount of about 0.1-50% by weight, based on the weight of the coating composition.

3. The coating composition of claim 1 in which the acrylic polymer consists essentially of
   15-25% by weight of styrene,
   45-55% by weight of butylmethacrylate, and
   25-35% by weight of a hydroxy ethyl acrylate.

4. The coating composition of claim 3 wherein the polyester polyol comprises the esterification product of monoester of neopentyl glycol hydroxy pivalic acid, neopentyl glycol, phthalic anhydride, isophthalic acid and adipic acid.

5. The coating composition of claim 4 wherein the polyester polyol is a blend of the polyester of claim 4 and a second ester mixture of the formula:

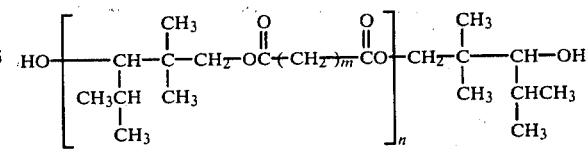

where n=0-4 and m=1-6.

6. The coating composition of claim 5 wherein the second polyester polyol is the condensation product of 2,2,4-trimethyl-1,3-pentane diol and a mixture of succinic, glutaric, and adipic acids in a weight ratio of about 1:2:1.

7. The coating composition of claims 1, 3, 4, or 5 wherein the binder is
   (1) 15-45% by weight, based on the weight of the binder, of the acrylic polymer,
   (2) 25-45% by weight, based on the weight of the binder, of the polyester polyol, and
   (3) 20-35% by weight, based on the weight of the binder, of the alkylated melamine formaldehyde crosslinking agent.

8. The coating composition of claim 4 in which the crosslinking agent is hexamethoxybutoxy methyl melamine.

9. The coating composition of claim 1 or 8 containing about 0.1-2.0% by weight of an acid catalyst.

10. The coating composition of claim 9 in which the catalyst is paratoluene sulfonic acid, dodecyl benzene sulfonic acid, dinonyl naphthalene disulfonic acid or an amine adduct of said acids.

11. The coating composition of claim 1 containing about 0.1-5% by weight, based on the weight of the binder, of an ultraviolet light stabilizer.

12. The coating composition of claim 1 containing about 0.1-5% by weight, based on the weight of the binder, of an antioxidant.

13. A substrate coated with a fully cured layer of the composition of claim 2.

* * * * *